(12) United States Patent
Jaruvatee et al.

(10) Patent No.: US 8,745,975 B2
(45) Date of Patent: Jun. 10, 2014

(54) EXHAUST SYSTEM

(75) Inventors: Chaiwat Jaruvatee, Stuttgart (DE); Florian Kortendiek, Stuttgart (DE); Christoph Lauzansky, Stuttgart (DE)

(73) Assignee: Bosch Emission Systems GmbH & Co. KG, Stuttgart (DE)

(*) Notice: Subject to any disclaimer, the term of this patent is extended or adjusted under 35 U.S.C. 154(b) by 60 days.

(21) Appl. No.: 13/489,049

(22) Filed: Jun. 5, 2012

(65) Prior Publication Data
US 2012/0324872 A1 Dec. 27, 2012

(30) Foreign Application Priority Data
Jun. 7, 2011 (DE) .................. 10 2011 077 155

(51) Int. Cl.
*F01N 3/10* (2006.01)

(52) U.S. Cl.
USPC .............................................. 60/303; 60/317

(58) Field of Classification Search
USPC ............................................... 60/303, 317
See application file for complete search history.

(56) References Cited

U.S. PATENT DOCUMENTS

| 2006/0245296 A1* | 11/2006 | Nishioka et al. | 366/174.1 |
| 2008/0302088 A1* | 12/2008 | Koehler et al. | 60/286 |
| 2009/0120066 A1* | 5/2009 | VanderGriend et al. | 60/285 |
| 2011/0214415 A1* | 9/2011 | Thomas | 60/297 |

FOREIGN PATENT DOCUMENTS

| DE | 102008056392 A1 | 7/2009 |
| DE | 102010002245 A1 | 10/2010 |
| JP | 2223624 A | 9/1990 |
| JP | 2006329019 A | 12/2006 |
| WO | WO 2007125230 A1 * | 11/2007 |

* cited by examiner

*Primary Examiner* — Thomas Denion
*Assistant Examiner* — Jason Shanske
(74) *Attorney, Agent, or Firm* — Reinhart Boerner Van Deuren P.C.

(57) ABSTRACT

Embodiments of the invention are directed to an exhaust system for a combustion engine with a bent pipe section conducting an exhaust gas flow. The exhaust system further includes an injector for introducing a liquid reduction agent into the exhaust gas flow, which is connected to the pipe section via a connecting pipe so that the injector can introduce the reduction agent through the connecting pipe into an introduction region of the pipe section into the exhaust gas flow. The risk of a crystallization of the reduction agent can be reduced with a return flow plate, which in the pipe section is arranged upstream of the introduction region.

17 Claims, 2 Drawing Sheets

EXHAUST SYSTEM

CROSS-REFERENCE TO RELATED PATENT APPLICATIONS

This patent application claims priority to German Patent Application No. 102011077155.7, filed Jun. 7, 2011, the entire teachings and disclosure of which are incorporated herein by reference thereto.

FIELD OF THE INVENTION

The present invention relates to an exhaust system for a combustion engine, in particular of a motor vehicle. The present invention additionally relates to a return flow plate for such an exhaust system.

BACKGROUND OF THE INVENTION

For reducing nitric oxide emissions of combustion engines it is known to arrange an SCR-catalytic converter in an exhaust system of the combustion engine, in which a selective catalytic reduction can be carried out. By apportioning a suitable reduction agent upstream of the SCR-catalytic converter, the nitric oxide can be reduced to nitrogen and carbon dioxide. A suitable reduction agent in this case is a watery urea solution. Through thermolisys and hydrolysis the urea can be transformed into ammonia, which on the SCR-catalytic converter makes possible an effective conversion of the nitric oxides into nitrogen and carbon dioxide.

Problematic on introducing the watery urea solution is the fact that in the hot exhaust gas the water component of the injected mixture evaporates more rapidly than the urea component, so that it can happen that concentrated urea accumulates on comparatively cold walls of the exhaust system, where it crystallises. During the crystallisation, by products such as biuret and melamine can be created, which no longer can be broken down so easily or not at all. Such residues lead to a contamination of the exhaust system and can impair its operation. Furthermore, these deposits reduce the effectiveness of the exhaust gas cleaning, since a part of the urea is not available for forming ammonia.

The present invention deals with the problem of stating an improved embodiment for an exhaust system of the type mentioned at the outset, which is characterized in particular in that the risk of a crystallisation of the urea is reduced.

With the present invention, this problem is solved in particular through the subjects of the independent claims. Advantageous embodiments are the subject of the dependent claims.

BRIEF SUMMARY OF THE INVENTION

The invention is based on the general idea of arranging a return flow plate in a pipe section, which serves for conducting an exhaust gas flow and which comprises an inlet region and an outlet region, upstream of an introduction region which is located between the inlet region and the outlet region and in which an injector introduces a liquid reduction agent, in particular watery urea solution. The return flow plate generates a return flow of the exhaust gas flow in the introduction region, i.e. a vortex which results in that the introduced droplets of the reduction agent are swirled up and reduced in size, as a result of which their relative surface area is enlarged, which favours a rapid evaporation of the reduction agent. Furthermore, the return flow brings about that the introduced reduction agent—if at all—is preferably deposited on the return flow plate, but which is exposed to a direct admission of the exhaust gas flow, so that the return flow plate usually has a temperature which is too high for the urea to crystallise. The risk of a crystallisation of the urea can be substantially reduced by this.

Practically, the return flow plate is arranged in the pipe section so that it extends with its longitudinal direction in the direction of the outlet region in a sloping manner to a flow direction, which comprises the exhaust gas flow in the inlet region. Furthermore, the return flow plate is practically positioned in the pipe section so that it can be subjected to a lateral exhaust gas circulation flow, i.e. transversely to its longitudinal direction. Thus, the return flow plate traverses the cross section of the pipe section through which the flow can flow upstream of the introduction region with a more or less pronounced angularity relative to the exhaust gas flow and in the process can be subjected to a lateral flow circulation, in order to create the return flow in the exhaust gas flow. While an onflow side or front side or windward side of the return flow plate is exposed to the oncoming exhaust gas flow, an outflow side or return side or leeward side facing away from that faces the introduction region. As a consequence, the reduction agent cannot be directly impinged by the oncoming exhaust gas flow. The exhaust gas flow, which laterally circulates about the return flow plate rather creates pronounced vortex cylinders which rotate in the introduction region so that they drive the injected reduction agent in the direction of the return flow plate. In this manner, a contacting of the reduction agent for example with a wall of the pipe section can be effectively avoided.

According to an advantageous embodiment, the injector is connected to the pipe section via a connection pipe, so that the injector introduces the reduction agent into the exhaust gas flow through the connection pipe into the introduction region in the direction of the outlet region.

With an advantageous embodiment, the return flow plate can comprise an onflow surface and an outflow surface, which are enclosed by a plate start facing the connection pipe, a plate end facing the outlet region and two plate side margins extending from the plate start to the plate end. Here, the onflow surface is exposed to the exhaust gas flow and forms the windward side of the return flow plate. In contrast to this, the outflow surface faces the introduction region and forms the leeward side of the return flow plate. The lateral circulation flow about the return flow plate mainly takes place in the region of the plate side margins.

In particular, the plate side margins can extend substantially in a straight line. In doing so, they practically do not run parallel to each other, but diverge from the plate start to the plate end so that their spacing from each other increases from the plate start to the plate end.

According to an advantageous embodiment, a width of the return flow plate measured transversely to the longitudinal direction and transversely to the flow direction of the exhaust gas flow can increase in the direction of the outlet end. In particular, the spacing between the plate side margins in the longitudinal direction of the return flow plate thus increases from the plate start to the plate end.

Positioning of the return flow plate in the bent pipe section in this case takes place such that the onflow side faces an arc inside of the pipe section, while the outflow side faces an arc outside of the pipe section. The arc inside has a smaller arc radius than the arc outside.

Through the geometry of the return flow plate an effective vortex formation can be realised without the flow resistance of the pipe section increasing quite as much. In a starting region facing the arc outside, the return flow plate forms only a comparatively low flow resistance, to which the main component of the exhaust gas flow is exposed.

Practical is an embodiment, wherein the return flow plate is concavely curved towards the introduction region transversely to the longitudinal direction or convexly curved away from the introduction region. Such a profiling of the return flow plate promotes the formation of the return flow vortices on the back or outflow side of the return flow plate.

Practically, the injector is configured so that it introduces the reduction agent in the form of a spray cone, which diverges in the spraying direction.

According to an advantageous embodiment, the return flow plate with its longitudinal direction can substantially extend parallel to a surface line of the spray cone. In particular, the formulation "substantially" is to permit deviations of ±20%. In addition or alternatively it can be provided that the return flow plate widens in its longitudinal direction at an angle which is substantially equal to the cone angle of the spray cone. Here, too, the formulation "substantially" is to cover in particular deviations of ±20%. By adapting the geometry and/or the arrangement of the return flow plate to the geometry of the spray cone a particularly effective swirling of the sprayed-in reduction agent can be realised, while only a comparatively small flow resistance is created at the same time.

With a further advantageous embodiment, the return flow plate can be fastened to the pipe section at a plate start facing the connection pipe. This results in a fixed positioning for the return flow plate on the pipe section. Practically, the return flow plate in this case can comprise a fastening console at the plate start, via which the return flow plate is fastened to the pipe section. With the help of such a fastening console the return flow plate can be fastened to the pipe section particularly easily. For example, a spot weld can be realised in the region of the fastening console. It is likewise possible to form at least one projection on the fastening console, which engages into a slot introduced in a wall of the pipe section and which in particular can penetrate this wall. In this manner, a fixing of the return flow plate to the pipe section from the outside is simplified.

With a further embodiment, the return flow plate can have a gap towards the pipe section or on its wall at a plate start facing the connection pipe. Because of this, the return flow plate can also be circulated by the exhaust gas flow at the plate start. Such a gap can be realised in particular in the region of the fastening console mentioned before, wherein the fastening console then laterally bridges the spacing between plate start and pipe section. In particular, the return flow plate can have a deflection contour at the plate start, which deflects the exhaust gas stream flowing through the gap into the connection pipe. By this measure, the risk that reduction agent settles and crystallises on the injector or on the connection pipe can be reduced in particular.

With a further advantageous embodiment, the return flow plate can be arranged freely standing in the outlet region on a plate end facing the outlet region or loosely contact the pipe section. In this manner, the return flow plate can carry out thermally-induced relative movements relative to the pipe section, as a result of which the development of mechanical stresses can be avoided.

Advantageous, here, is a further development, wherein the return flow plate at its plate end comprises a support structure which loosely contacts the pipe section. With the help of this support structure, the positioning of the return flow plate in the region of its plate end can be proved. Here, it can be practically provided that the support structure is configured ring-shaped or ring segment-shaped and thereby extends in the circumferential direction of the pipe section in the outlet region. Practically, the ring-shaped or ring segment-shaped contour of the support structure is practically adapted to the geometry of the cylindrical outlet region of the pipe section, as a result of which a flat contact and thus an effective support can be realised.

With another advantageous embodiment, the return flow plate can have at least one marginal clearance and/or at least one opening, which makes possible a through-flow of the return flow plate. With the help of such a clearance or opening, the increase of the flow resistance of the pipe section can be reduced, which is accompanied by the introduction of the return flow plate. According to a practical embodiment it can be provided here to configure the return flow plate perforated, i.e. with a multiplicity of openings. Insofar as only a marginal clearance is present, this can be practically arranged on the outflow side, i.e. at the plate end.

Particularly advantageously, the return flow plate is a shaped sheet metal part produced from one piece.

According to a particularly advantageous embodiment, the return flow plate can have a protective coating on its onflow surface and/or on its outflow surface for protecting the return flow plate from mechanical and/or chemical influences. Such a protective coating for example increases the strength of the return flow plate against impacting drops. In addition or alternatively, the protective coating can protect for example from corrosion or other chemical attacks.

As already indicated further up, the fixing of the return flow plate to the pipe section can be realised by means of a mechanical connection. For example through a plug connection, which can be combined with a welded connection and/or with a clamped connection. It is clear that the fixing of the return flow plate to the pipe section can also be realised through any other mechanical connection or plug connection or welded connection or clamping connection.

The present invention also relates to a return flow plate for such an exhaust system.

The present invention relates to an exhaust system for a combustion engine, in particular of a motor vehicle, with a bent pipe section conducting an exhaust gas flow, which comprises an inlet region and an outlet region, and with an injector for introducing a liquid reduction agent into the exhaust gas flow, which is connected to the pipe section via a connecting pipe so that the injector can introduce the reduction agent through the connecting pipe into an introduction region of the pipe section located between inlet region and outlet region in the direction of the outlet region into the exhaust gas flow.

The risk of a crystallisation of the reduction agent can be reduced with a return flow plate, which in the pipe section is arranged upstream of the introduction region, which extends with its longitudinal direction in the direction of the outlet region sloped to a flow direction, which comprises the exhaust gas flow in the inlet region, and which can be subjected to a lateral circulation of the exhaust gas flow.

Further important features and advantages of the invention are obtained from the subclaims, from the drawings and from the associated Figure description by means of the drawings.

It is to be understood, that the features mentioned above and still to be explained in the following cannot only be used in the respective combination stated, but also in other combinations or by themselves, without leaving the scope of the present invention.

BRIEF DESCRIPTION OF THE DRAWINGS

Preferred exemplary embodiments of the invention are shown in the drawings and are explained in more detail in the following description, wherein same reference characters refer to same or similar or functionally same components.

It shows, in each case schematically.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
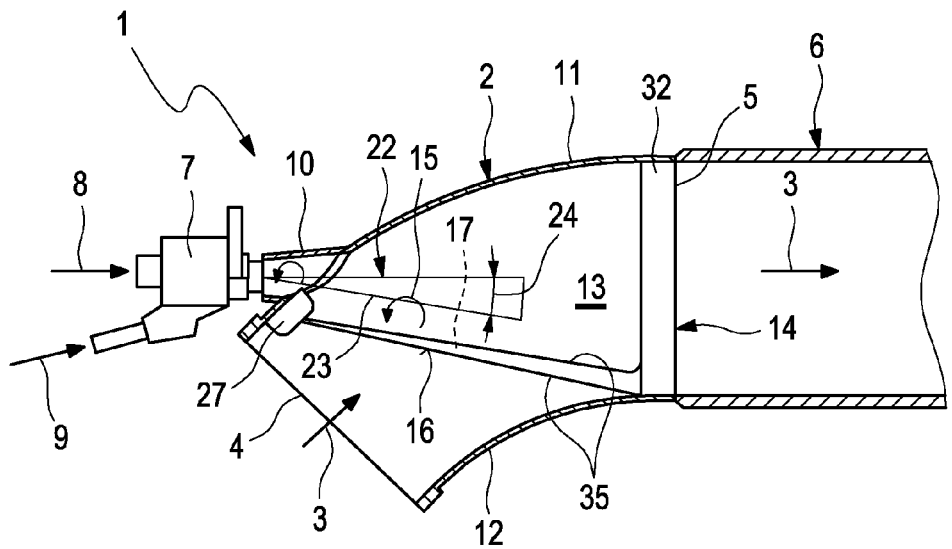
FIG. 1 to 3 in each case a greatly simplified, partially sectioned lateral view of an exhaust system in the region of a return flow plate, with different embodiments, FIGS. 4 to 7 in each case an isometric view of a return flow plate, with different embodiments.
Figure 2:
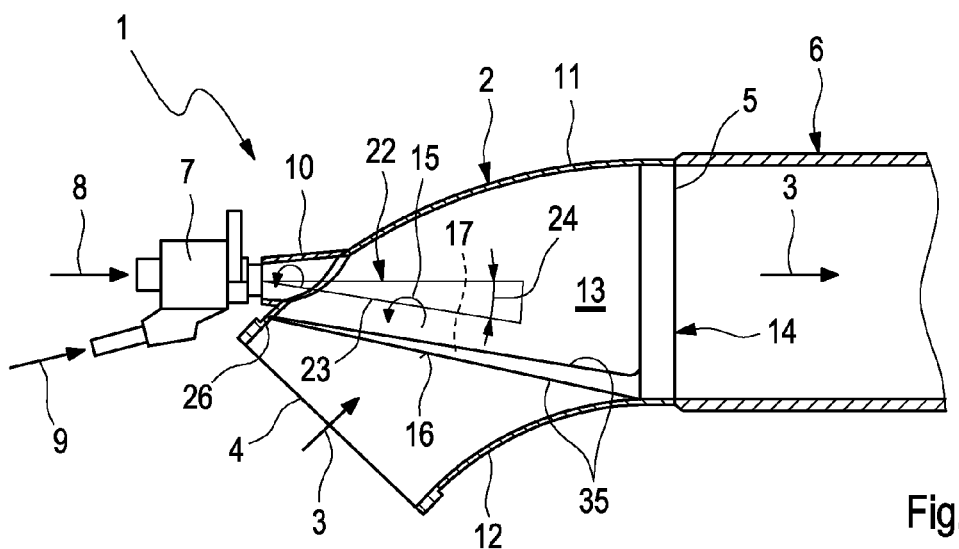
Figure 3:
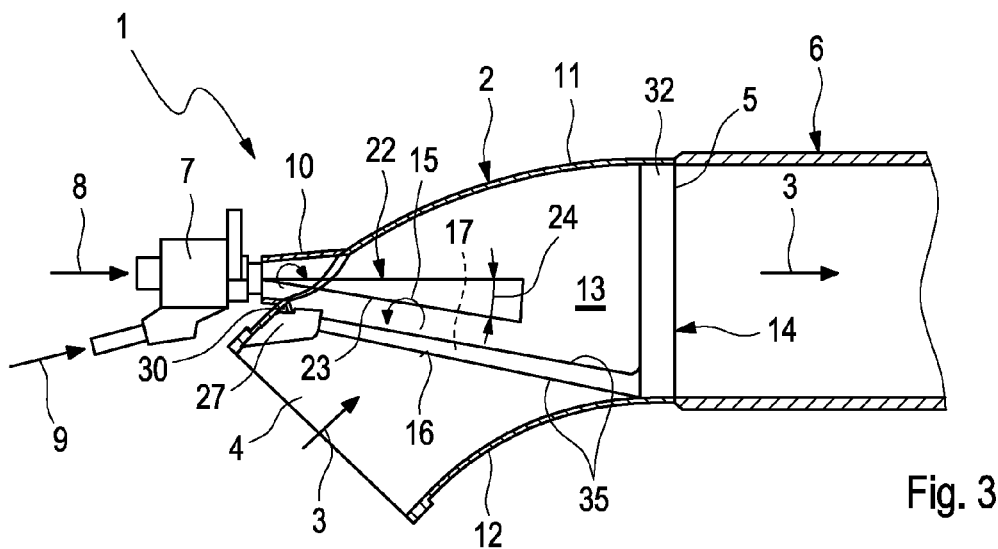

Corresponding to FIGS. 1 to 3, an exhaust system 1, with the help of which exhaust gases of a combustion engine, preferentially of a motor vehicle, are discharged, comprises a bent pipe section 2, that serves for conducting an exhaust gas flow 3 indicated by arrows and which comprises an inlet region 4 and an outlet region 5. A straight-line pipe section 6 each is connected to the bent pipe section 2 at the outlet side in the examples of FIGS. 1 to 3.

The exhaust system 1 is equipped with an injector 7, with the help of which a liquid reduction agent 8 can be introduced into the exhaust gas flow 3. As liquid reduction agent 8, a watery urea solution is preferably used, which is fed to the injector 7 corresponding to an arrow. The injector 7 can additionally be supplied with a coolant 9 corresponding to an arrow, in order to protect the injector 7 against the high temperatures of the exhaust system 1.

The injector 7 is connected to the bent pipe section 2 via a connecting pipe 10, namely to an arc outside 11 of the bent pipe section, which is located opposite an arc inside 12. The positioning of the connecting pipe 10 on the pipe section 2 is practically carried out such that the injector 7 can introduce the reduction agent 8 through the connecting pipe 10 into an introduction region 13 into the exhaust gas flow 3, wherein this introduction region 13 with respect to the flow direction is located between the inlet region 4 and the outlet region 5. Here, the reduction agent 8 is introduced in the direction of the outlet region 5 into the introduction region 13, in particular by way of injection or spraying.

The exhaust system 1 introduced here is furthermore equipped with a return flow plate 14, which is arranged in the pipe section 2 upstream of the introduction region 13. The return plate 14 in this case is arranged so that it extends in the direction of the outlet region 5 with its longitudinal direction, where it traverses the cross section of the bent pipe section 2 through which a flow can flow. The return flow plate 14 furthermore extends sloped towards a flow direction, which comprises the exhaust gas flow 3 upstream of the return plate 14, e.g. in the inlet region 4. Thus, the return flow plate 14 is angled with respect to the oncoming exhaust gas flow 3. In addition, the return flow plate 14 is so dimensioned that it is subjected to a circulation of the exhaust gas flow 3 transversely to its longitudinal direction, which in the FIGS. 1 to 3 extends from the left to the right. In this transverse direction of the return flow plate 14, which stands perpendicularly on the drawing plane in the FIGS. 1 to 3, the return flow plate 14 thus does not extend between its longitudinal ends as far as to the bent pipe section 2 but maintains a distance in this respect, which makes possible the desired lateral flow circulation of the return flow plate 14 through the exhaust gas flow 3.

The lateral flow circulation of the return flow plate 14 creates a return flow or a vortex formation, which is indicated in the FIGS. 1 to 3 by a rotary arrow 15.

The return flow plate 14 has an onflow surface 16 facing the oncoming exhaust gas flow 3 and an outflow surface 17 facing away from that. According to the FIGS. 4 to 7, the outflow surface 17 facing the beholder and the onflow surface 16 facing away from the beholder are enclosed by the longitudinal ends of the plates 14, namely by a plate start 18 and a plate end 19 as well as two plate side margins 20 extending from the plate start 18 to the plate end 19. The plate start 18 faces the connecting pipe 10 in the assembled state. The plate end 19 faces the outlet region 5 in the assembled state. In the FIGS. 4 to 7, the longitudinal direction of the return flow plate 14 is indicated by a double arrow and designated 21.

The return flow plate 14 in the case of the embodiment shown here is shaped in such a manner that a width of the return flow plate 14, which is measured transversely to the longitudinal direction 21 and transversely to the thickness direction of the return flow plate 14, increases from the plate start 18 in the direction of the plate end 19. In the example, the plate side margins 20 are of a straight-line design, so that the width of the return flow plate 14 substantially corresponds to the distance between the plate side margins 20. Since the plate side margins 20 diverge in the longitudinal direction 21 starting out from the plate start 18, said distance, that is the width of the return flow plate 14, increases accordingly.

The return flow plate 14 is concavely curved transversely to the longitudinal direction 21 towards the introduction region 13. In other words, the outflow surface 17 has a concave contour in the profile transversely to the longitudinal direction 21. Since the return flow plate 14 is practically configured as sheet metal body, it is additionally convexly curved away from the introduction region 13. In other words, the onflow surface 16 is provided with a convex contour transversely to the longitudinal direction 21.

As is evident from the FIGS. 1 to 3, the injector 7 can be practically configured so that it introduces the reduction agent 8 in the form of a spray cone 22. This spray cone 22 has a surface line 23 facing the return flow plate 14 and a cone angle 24. Practically, the return flow plate 14 is now arranged in the bent pipe section 2 so that with its longitudinal direction 21 it extends substantially parallel to the surface line 23 facing it. Additionally or alternatively, the return flow plate 14 can widen at an angle which is substantially equal to the cone angle 24. In other words, the straight-line plate side margins 20 intersect each other at an angle which substantially corresponds to the cone angle 24 of the spray cone 22.

The return flow plate 14 is practically fastened to the pipe section 2 in the region of its plate start 18, namely in particular closely to the pipe section 10. Suitable fastening methods are for example welded connections or soldered connections. According to FIG. 6, a rib 25 projecting in the longitudinal direction 21 can be formed at the plate start 18, which with the embodiment shown in FIG. 2 is inserted in a slit which is not evident here, that is formed in a wall 26 of the bent pipe section 2, wherein the slit can also penetrate the wall 26 so that the fastening of the return flow plate 14 on the pipe section 2 can also be carried out from the outside.

According to the embodiments of the FIGS. 1, 3 to 5 and 7, the return flow plate 14 can comprise a fastening console 27 in the region of the plate start 18, via which the return flow plate 14 is fastened to the pipe section 2.

Figure 4:
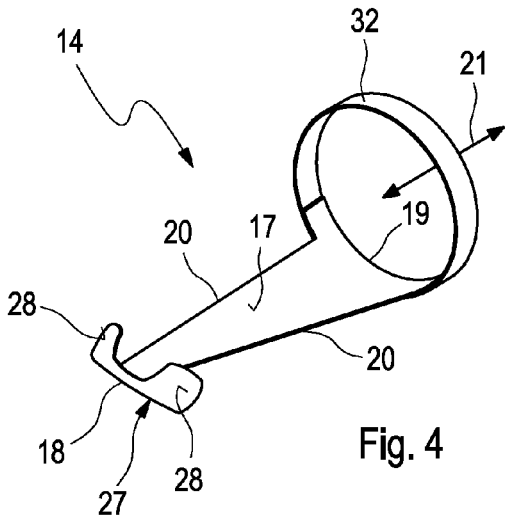

With the embodiments shown in the FIGS. 1 and 4, the console 27 can comprise support surfaces 28, which areally come to bear against the inside of the wall 26 of the bent pipe section 2, wherein it is then possible in particular to weld these support surfaces 28 to the pipe section 2 through the wall 26.

Figure 5:
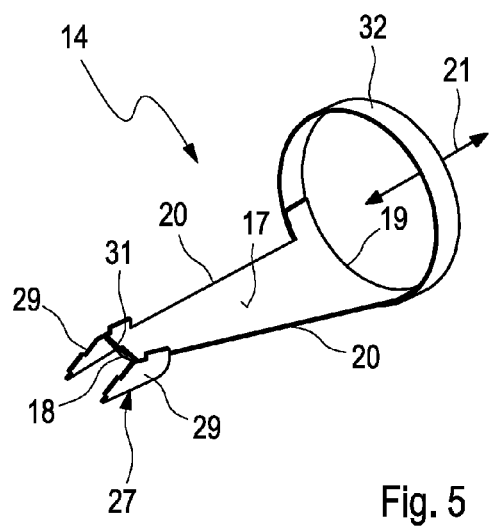
Figure 6:
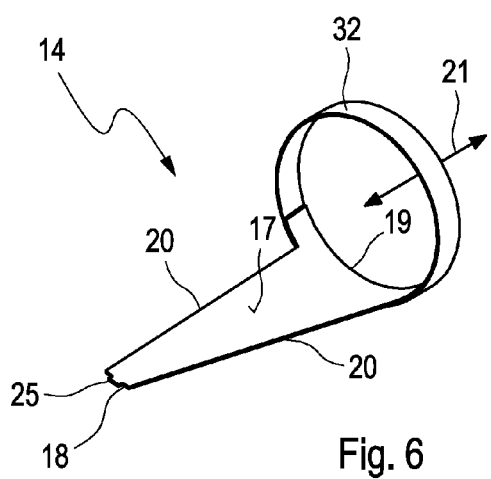
Figure 7:
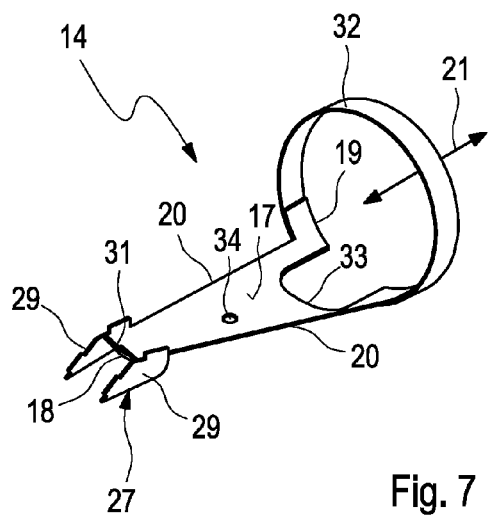

With the embodiments of the FIGS. 3, 5 and 7, ribs or projections 29 are moulded onto the console 27, which can be inserted in slits, which are worked into the wall 26 and which in particular can penetrate the wall 26. Thus, the fixing of the return flow plate 14 in this case is also possible from the outside.

In particular with the embodiments of the FIGS. 3, 5 and 7, the return flow plate 14 can be configured so that a gap 30 is created between the bent pipe section 2 and the plate start 18, through which during the operation of the exhaust system 1 a part of the exhaust gas flow 3 can flow in order to thus circulate the return flow plate 14 at the plate start 18. With the embodiments of the FIGS. 3, 5 and 7, a deflection contour 31 is formed at the plate start 18 which is configured so that it deflects an exhaust gas flow flowing through the gap 30 into the connecting pipe 10.

According to the FIGS. 1 to 3, the return flow plate 14 is practically configured so that it loosely contacts the pipe section at its plate end 19 facing the outlet region 5. Alternatively, it is likewise possible that the return flow plate 14 with its plate end 19 is arranged in the outlet region 5 in a free-standing manner. Insofar, however, that a contact is desired wherein the return flow plate 14 loosely contacts the pipe section 2 in the region of its plate end 19, the return flow plate 14 can have a support contour 32 at its plate end 19, which then loosely contacts the pipe section 2. In the case of the embodiments shown here, the support structure 32 is of a ring-shaped design, so that it extends in a ring-shaped manner in the circumferential direction of the pipe section 2 in the outlet region 5. Practically, the support contour 32 in this case is formed complementarily to the cross section of the outlet region 5.

Thus, different possibilities for fixing the return flow plate 14 to the pipe section 2 are described above. Predominantly mechanical connections, in particular plug connections that can be combined with welded connections and/or clamped connections were introduced here. It is clear that the fixing of the return flow plate 14 to the pipe section 2 can also be realised through any other mechanical connection or plug connection or welded connection or clamped connection.

The embodiment shown in FIG. 7, differs from the embodiment shown in FIG. 5 by a marginal clearance 33, which is formed out of the plate end 19 in the example. This clearance 32 makes possible a flow through the return flow plate 14. Alternatively, it is likewise possible to equip the return flow plate 14 with at least one opening 34, which makes possible a flow through the return flow plate 14. Such an opening 34 is shown in FIG. 7 purely as an example. For example, the return flow plate 14 can be perforated. With the embodiment shown in FIG. 7, the support structure 32 is configured in the shape of a ring segment, so that it does not form a closed ring. In the region of the clearance 33, the support structure 32 is interrupted here.

The return flow plate 14 can preferably be a shaped sheet metal part produced from one piece, which simplifies the production of the return flow plate 14.

The return flow plate 14 can have a protective coating 35 on its onflow surface 16 and/or on its outflow surface 17 for protecting the return flow plate 14 from mechanical and/or chemical influences. For example, such a protective coating 35 increases the strength of the return flow plate 14 against impinging drops. Additionally or alternatively, the protective coating 35 can protect for example against corrosion or other chemical attacks.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An exhaust system for a combustion engine, in particular of a motor vehicle, comprising:
    a bent pipe section conducting an exhaust gas flow, which comprises an inlet region and an outlet region,
    an injector for introducing a liquid reduction agent into the exhaust gas flow, which is connected to the pipe section via a connecting pipe so that the injector can introduce the reduction agent through the connecting pipe into an introduction region of the pipe section located between inlet region and outlet region in the direction of the outlet region into the exhaust gas flow,
    a return flow plate, which in the pipe section is arranged upstream of the introduction region, which with its longitudinal direction extends sloped relative to a flow direction in the direction of the outlet region, which comprises the exhaust gas flow in the inlet region and which can be subjected to a lateral exhaust gas flow.

2. The exhaust system according to claim 1, wherein the return flow plate comprises an onflow surface and an outflow surface, which is enclosed by a plate start facing the connecting pipe, a plate end facing the outlet region and two plate side margins extending from the plate start to the plate end.

3. The exhaust system according to claim 2,
wherein a width of the return flow plate measured transversely to the longitudinal direction increases in the direction of the plate end.

4. The exhaust system according to claim 1,
wherein the return flow plate is at least one of concavely curved towards the introduction region transversely to the longitudinal direction, and/or convexly curved away from the introduction region.

5. The exhaust system according to claim 1,
wherein the injector introduces the reduction agent in the form of a spray cone, wherein the return flow plate with its longitudinal direction substantially extends parallel to a surface line of the spray cone facing the return flow plate.

6. The exhaust system according to claim 1,
wherein the injector introduces the reduction agent in the form of a spray cone, wherein the return flow plate widens in its longitudinal direction at an angle which is substantially equal to the cone angle of the spray cone.

7. The exhaust system according to claim 1,
wherein the return flow plate at a plate start facing the connecting pipe is fastened to the pipe section, wherein it can be provided in particular that the return flow plate comprises a fastening console at the plate start, via which the return flow plate is fastened to the pipe section.

8. The exhaust system according to claim 1,
wherein the return flow plate at a plate start facing the connecting pipe comprises a gap to the pipe section, wherein it can be provided in particular that the return flow plate at the plate start comprises a deflection contour, which deflects the exhaust gas flow flowing through the gap into the connecting pipe.

9. The exhaust system according to claim 1,
wherein the return flow plate at a plate end facing the outlet region is arranged in the outlet region in a free-standing manner or loosely contacts the pipe section.

10. The exhaust system according to claim 9,
wherein the return flow plate at its plate end comprises a support structure loosely contacting the pipe section, wherein it can be provided in particular that the support structure extends in a ring-shaped or ring segment-shaped manner in the circumferential direction of the pipe section in the outlet region.

11. The exhaust system according to claim 1,
wherein the return flow plate comprises at least one marginal clearance and at least one opening, which makes possible a flow through the return flow plate, wherein it can be provided in particular that the return flow plate is perforated.

12. The exhaust system according to claim 1,
wherein the return flow plate on its onflow surface and on its outflow surface comprises a protective coating for protecting the return flow plate against mechanical and chemical influences.

13. The exhaust system according to claim 1,
wherein the return flow plate is fastened to the pipe section through a mechanical connection.

14. The exhaust system according to claim 1, where the return flow plate is fastened to the pipe section through a plug connection.

15. The exhaust system according to claim 1, where the return flow plate is fastened to the pipe section through a welded connection.

16. The exhaust system according to claim 1, where the return flow plate is fastened to the pipe section through a clamped connection.

17. A return flow plate for an exhaust system according to claim 1.

* * * * *